(12) United States Patent
Brosnan et al.

(10) Patent No.: US 11,488,191 B2
(45) Date of Patent: Nov. 1, 2022

(54) PROVIDING MINED USER INFORMATION TO SUPPLIERS FOR GENERATING CUSTOMIZED BIDS

(71) Applicant: Toshiba Global Commerce Solutions Holdings Corporation, Tokyo (JP)

(72) Inventors: Susan Winter Brosnan, Raleigh, NC (US); Kenneth Hammer, Cary, NC (US); Stacy Arrington, Morrisville, NC (US); Patricia Stephany Hogan, Raleigh, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 21 days.

(21) Appl. No.: 16/366,890

(22) Filed: Mar. 27, 2019

(65) Prior Publication Data

US 2020/0311758 A1   Oct. 1, 2020

(51) Int. Cl.
  *G06Q 30/00* (2012.01)
  *G06Q 30/02* (2012.01)
  *G06Q 30/08* (2012.01)

(52) U.S. Cl.
  CPC ..... *G06Q 30/0222* (2013.01); *G06Q 30/0257* (2013.01); *G06Q 30/08* (2013.01)

(58) Field of Classification Search
  CPC . G06Q 30/0222; G06Q 30/0257; G06Q 30/08
  USPC ...................................... 705/14.23
  See application file for complete search history.

(56) References Cited

U.S. PATENT DOCUMENTS

| | | | |
|---|---|---|---|
| 6,839,683 B1 * | 1/2005 | Walker | G06Q 30/02 705/14.19 |
| 7,130,815 B1 | 10/2006 | Gupta | |
| 8,036,950 B1 * | 10/2011 | Schneur | G06Q 30/08 705/26.4 |
| 8,521,609 B2 | 8/2013 | Lewis et al. | |

(Continued)

FOREIGN PATENT DOCUMENTS

| | | |
|---|---|---|
| KR | 101729414 B1 | 4/2017 |
| WO | 2013062481 A1 | 5/2013 |

OTHER PUBLICATIONS

T. Luo, S. S. Kanhere, J. Huang, S. K. Das and F. Wu, "Sustainable Incentives for Mobile Crowdsensing: Auctions, Lotteries, and Trust and Reputation Systems," in IEEE Communications Magazine, vol. 55, No. 3, pp. 68-74, Mar. 2017, doi: 10.1109/MCOM .2017. 1600746CM. (Year: 2017).*

(Continued)

*Primary Examiner* — Sun M Li

(74) *Attorney, Agent, or Firm* — Patterson + Sheridan, LLP

(57) ABSTRACT

Embodiments herein describe a reverse auction application which can collect and display bids for a product or service to a user. The reverse auction application can also gather information about the user such as user preferences, brand loyalty, user characteristics, and the like. This information is provided to suppliers when requesting bids. The suppliers can use this information to then generate customized bids for the user. That is, unlike typical reverse auctions where bidders only compete over price, the bidders can use the user information provided by the reverse auction application to add incentives, offer combination orders, or offer additional services in their bids, as well as determine an optimum price.

9 Claims, 6 Drawing Sheets

(56) References Cited

U.S. PATENT DOCUMENTS

| | | | |
|---|---|---|---|
| 9,076,175 B2 | 7/2015 | Ramer et al. | |
| 11,010,827 B1* | 5/2021 | Latronico | G06Q 40/025 |
| 2002/0161689 A1* | 10/2002 | Segal | G06Q 40/04 |
| | | | 705/37 |
| 2003/0055729 A1* | 3/2003 | Bezos | G06Q 30/08 |
| | | | 705/14.31 |
| 2010/0082392 A1 | 4/2010 | Yang et al. | |
| 2011/0295722 A1 | 12/2011 | Reisman | |
| 2013/0085807 A1* | 4/2013 | Cincotta | G06Q 30/0203 |
| | | | 705/7.32 |
| 2013/0124317 A1 | 5/2013 | Ramer et al. | |
| 2013/0246149 A1* | 9/2013 | Weiss | G06Q 30/02 |
| | | | 705/14.26 |
| 2013/0297448 A1 | 11/2013 | Lester et al. | |
| 2014/0244361 A1 | 8/2014 | Zhang et al. | |
| 2014/0330663 A1 | 11/2014 | Chambers | |
| 2014/0344073 A1* | 11/2014 | Yan | G06Q 30/0275 |
| | | | 705/14.71 |
| 2015/0039388 A1 | 2/2015 | Rajaraman | |
| 2015/0169891 A1* | 6/2015 | Hook | G06Q 30/0257 |
| | | | 726/29 |
| 2015/0186964 A1 | 7/2015 | Vieira et al. | |
| 2015/0213531 A1 | 7/2015 | Kung | |
| 2015/0332317 A1* | 11/2015 | Cui | G06Q 30/0275 |
| | | | 705/14.46 |
| 2015/0379596 A1 | 12/2015 | Li | |
| 2016/0027063 A1* | 1/2016 | Wexler | G06F 3/011 |
| | | | 705/14.66 |
| 2017/0364978 A1 | 12/2017 | Loeb et al. | |

OTHER PUBLICATIONS

T. S. Chandrashekar, Y. Narahari, C. H. Rosa, D. M. Kulkarni, J. D. Tew and P. Dayama, "Auction-Based Mechanisms for Electronic Procurement," in IEEE Transactions on Automation Science and Engineering, vol. 4, No. 3, pp. 297-321, Jul. 2007, doi: 10.1109/TASE.2006.885126. (Year: 2007).*

Rucksack, Compare Prices on Amazon & eBay-Barcode Scanner, retrieved from: https://play.google.com/store/apps/details?id=com.rucksack.pricecomparisonforamazonebay.

ShopSavvy, ShopSavvy Barcode Scanner, retrieved from: https://play.google.com/store/apps/details?id=com.biggu.shopsavvy&hl=en_US.

* cited by examiner

PROVIDING MINED USER INFORMATION TO SUPPLIERS FOR GENERATING CUSTOMIZED BIDS

BACKGROUND

The present disclosure relates to a reverse auction where user preferences are provided to the bidders so the bidders can provide customized bids to the user.

A reverse auction is a type of auction in which the roles of buyer and seller are reversed. In an ordinary auction, buyers compete to obtain goods or services by offering increasingly higher prices. In a reverse auction, the sellers compete to obtain business from the buyer and prices can typically decrease as the sellers underbid each other. However, a reverse auction can also be a blind auction where each seller (e.g., bidder) provides only one bid. The bids are then collected and provided to the buyer who selects the winning bid.

SUMMARY

According to one embodiment of the present invention, a method includes receiving a user-selected advertisement, identifying a bid item being advertised in the advertisement, transmitting requests to a plurality of suppliers to submit bids for selling the bid item, generating, using one or more processors, information about a user based on at least one of previous purchases made by the user and web-browsing history of the user, transmitting the user information to the plurality of suppliers to use when generating customized bids corresponding to the bid item, displaying the customized bids received from the plurality of suppliers on a display of a user device, and informing a supplier of the plurality of suppliers of a winning bid selected from the customized bids.

Another embodiment described herein is a user device that includes a processor and a memory containing an auction application, where, when executed by the processor, the auction application performs an operation that includes receiving a user-selected advertisement, identifying a bid item being advertised in the advertisement, transmitting requests to a plurality of suppliers to submit bids for selling the bid item, generating, using one or more processors, information about a user based on at least one of previous purchases made by the user and web-browsing history of the user, transmitting the user information to the plurality of suppliers to use when generating customized bids corresponding to the bid item, displaying the customized bids received from the plurality of suppliers on a display of a user device, and informing a supplier of the plurality of suppliers of a winning bid selected from the customized bids.

Another embodiment described herein is a method that includes receiving a request from an auction application to submit a bid for selling a bid item, receiving user information from the auction application, wherein the user information contains information about a user initiating the request based on at least one of previous purchases made by the user and web-browsing history of the user, generating a price of the bid item to include in the bid based on the user information, transmitting the bid with the price to the auction application for display to the user.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe a reverse auction application which can collect and display bids for a product or service to a user. The reverse auction application can also gather information about the user such as user preferences, brand loyalty, user characteristics, and the like. This information is provided to suppliers when requesting bids. The suppliers can use this information to then generate customized bids for the user. That is, unlike typical reverse auctions where bidders only compete over price, the bidders can use the user information provided by the reverse auction application to add incentives, offer combination orders, or offer additional services in their bids, as well as determine an optimum price. Moreover, gathering the user information provides a technical solution to a problem with reverse auctions where often the supplier has little to no information about the buyer. In the embodiments herein, a user device (e.g., a smartphone, tablet, computing system, etc.) is relied on to gather or generate user information which is then provided to the suppliers to aid them when generating customized bids in response to the preferences, characteristics, and brand loyalty of the user.

In one embodiment, the reverse auction begins when the reverse auction application receives an advertisement that includes a product or service (referred to generally herein as a "bid item"). For example, the user may use a user device executing the reverse auction application to capture an advertisement displayed in a newspaper, a store display, TV or movie presentation, and the like. The reverse auction application identifies the product being advertised and submits requests for bids to a plurality of suppliers (which can be suppliers of a good or a service). In addition to requesting the bid, the reverse auction application also submits user information such as user preferences (e.g., willingness to try new products, free shipping, brand preferences), user characteristics (e.g., age and geographic location of the user), and brand loyalty. This information enables the suppliers to customize or tailor their bids for the particular user. As a result, a supplier may provide different bids to two different users for the same product or service.

Once a reverse auction is complete and the user has selected a winning bid, the application can provide feedback to the suppliers, including the suppliers which submitted losing bids. This feedback can be used to modify a user profile maintained by the suppliers which may help them when submitting future bids for the user. Moreover, the reverse auction application can provide information to advertisers indicating the advertisement selected by the user and the location of the user when selecting the advertisement. This information can help the advertisers identify the most successful advertisements and provide customized advertisements for the user in the future.

Figure 1:
FIG. 1 illustrates a user device used to perform a reverse auction, according to one embodiment.
Figure 1:
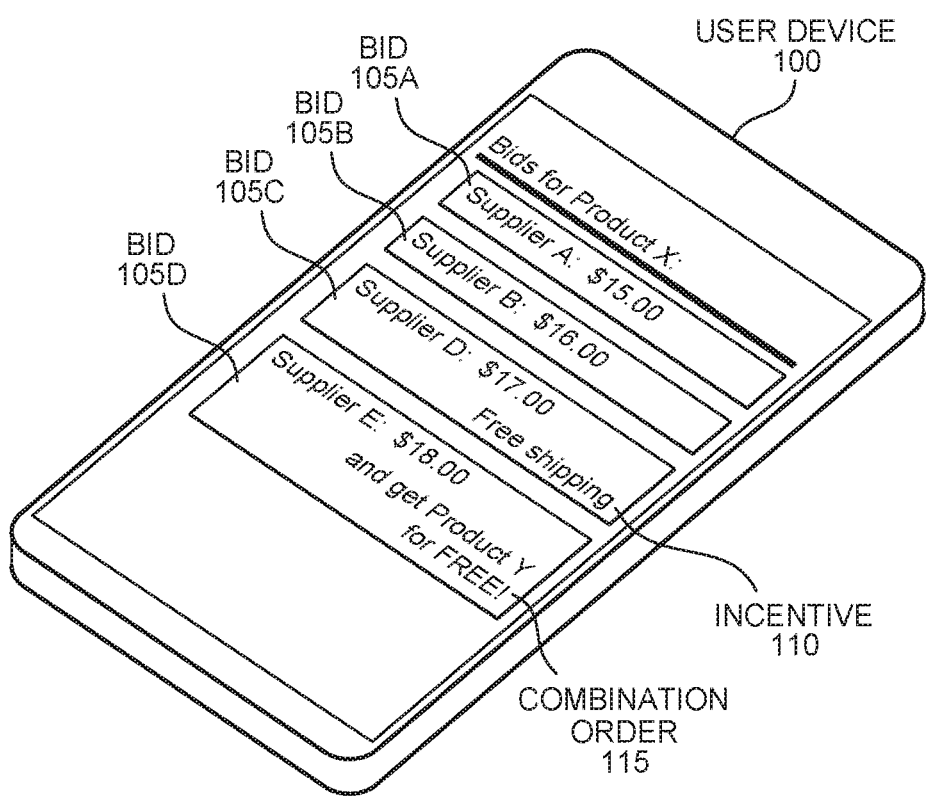

FIG. 1 illustrates a user device 100 used to perform a reverse auction, according to one embodiment. The user device 100 can be a handheld or portable device (e.g., smartphone, tablet, or laptop) or a stationary computing system (e.g., a desktop computer) that includes a display for outputting multiple bids 105 as part of a reverse auction. In one embodiment, the user device 100 includes a camera for capturing an image of an advertisement 120 for a particular product (e.g., Product X). While the embodiments below describe a reverse auction for a product, the techniques described herein can be used with any bid item such as a good, service, and the like.

The user device 100 determines the advertisement 120 is for Product X and then request bids 105 from a plurality of different suppliers—i.e., Suppliers A-D. These bids 105 are then displayed by the user device 100. In FIG. 1, each bid 105 includes at least a price that the user pays if that bid 105 is accepted. For example, each bid 105 may have a touch-sensitive button which the user presses to indicate she has selected that bid 105 as the winning bid.

In addition to displaying a price, the bids 105 can also include an incentive 110 or a combination order 115. In this example, the bid 105C includes a free shipping incentive 110. If this bid 105C is accepted, the user has to pay more than the bids 105A and 105B but there is no additional shipping charge. For example, an additional shipping charge may be added to the bids 105A and 105B unless the user uses an in-store pickup option. Thus, if the user frequently visits the brick and mortar location of the Suppliers A and B, she may select one of those bids since she does not need the product to be shipped to her.

The bid 105D includes the combination order 115 where an additional product (i.e., Product Y) is being offered along with Product X which was the product requested by the user. For example, Product X may be toothpaste while Product Y is a toothbrush. The Supplier D may want to promote Product Y, and thus, may add Product Y to the bid 105D for Product X while only adding a small (or no) additional cost to the price of the bid 105D.

As described in more detail below, the price of the bids 105 as well as the decision by the suppliers to add an incentive 110 or offer a combination order 115 may be influenced by information provided by a reverse auction application executing on the user device 100. Put differently, the reverse auction application provides information about the user (e.g., the user's preferences, characteristics, or brand loyalty) that the suppliers can use to generate customized bids for that user.

Figure 2:
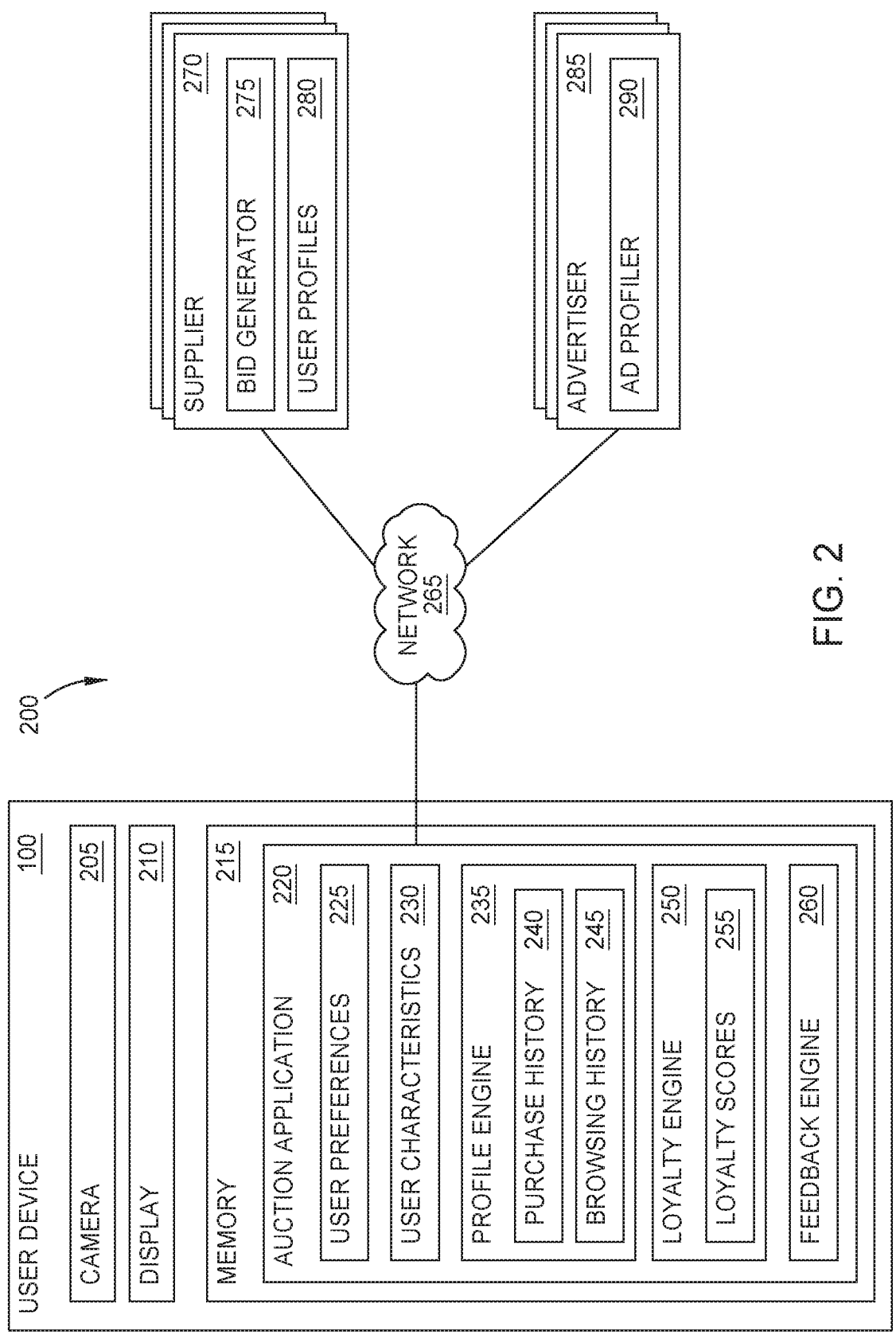
FIG. 2 is a block diagram of a system for performing a reverse auction, according to one embodiment.

FIG. 2 is a block diagram of a system 200 for performing a reverse auction, according to one embodiment. The system 200 includes the user device 100, a plurality of suppliers 270, and a plurality of advertisers 285 that are communicatively coupled via a network 265. The user device 100 includes a camera 205, a display 210, and memory 215. The camera 205 can capture images of an advertisement that includes a product or service that the user wants to purchase using a reverse auction. For example, the user may be reading a newspaper, watching TV or a movie, or see the advertisement in a store display. The user can then capture a picture of the advertisement using the camera 205.

Although in FIG. 2 the user device 100 includes a camera 205, a captured image of the advertisement is not necessary. Instead, the user may be browsing the Internet using the user device 100 and see an advertisement in a webpage which includes a product or service she would like to purchase. The user can select the advertisement to begin the reverse auction.

The memory 215 can include volatile and non-volatile memory elements which store an auction application 220 that performs a reverse auction. That is, after capturing an image using the camera 205 (or selecting an advertisement in a webpage), the image of the advertisement is sent to the auction application 220 which begins the reverse auction. The auction application 220 includes user preferences 225, user characteristics 230, a profile engine 235, a loyalty engine 250, and a feedback engine 260.

The user preferences 225 can include user information indicating a type of bid preferred by the user. That is, the user preference indicates a likelihood of the user selecting a bid of the same type in the future. For example, the user preference 225 may be indicate whether the user occasionally chooses alternative deals during a reverse auction (e.g., one type of bid), prefers bids with incentives (e.g., a second type of bid) such as free shipping, or prefers bids with combination orders (e.g., a third type of bid). In addition to providing information regarding the types of bids preferred by the user, the user preferences 225 can also indicate whether the user is frugal (e.g., the user primarily chooses the least expensive bids, and thus, has a high frugality score). In one embodiment, the user preferences 225 can be learned by providing the user with a questionnaire or asking the user targeted questions when installing the auction application 220 or setting up an account. Additionally, the profile engine 235 can learn user preferences 225 by evaluating the user's purchase history 240 (e.g., the winning bids selected by the user) and browsing history 245 (e.g., what type of webpages the user visits or types of purchases the user makes from online retailers).

The user characteristics 230 can include demographic information about the user such as age, marital status, education, profession, income level, geographic location, and the like. This information may also be obtained directly from the user or could be learned by the profile engine 235. For example, the profile engine 235 can estimate the income level or age of the user based on her purchases or websites she visits.

The loyalty engine 250 generates loyalty scores 255 for different products or brands purchased by the user. The loyalty scores 255 represent a user preference to a particular brand or a particular product sold by the brand which can be compared to loyalty scores 255 for other brands and their products. For example, the more the user purchases only a particular product (e.g., a particular brand of toothpaste), the higher the customer loyalty score for that product. For example, each time the user purchases the particular product, the loyalty engine 250 can increase the corresponding loyalty score 255. The loyalty scores 255 for competing products, which the user does not purchase or seldom purchase, have lower values. In one embodiment, the loyalty engine 250 uses the purchase history 240 to determine the loyalty scores 255.

For brands that sell different types of products (e.g., a company that sells cheese, condiments, and ready-to-make meals all under the same brand), the loyalty score can be applied to the brand as whole as well as to different products sold under that brand. For example, the loyalty score 255 for the brand can be used to predict whether the user is likely to purchase the same product that is sold by a different brand. For example, assume the user initiates a reverse auction to purchase cheddar cheese made by Brand A. The user may have never purchased the cheese from Brand A, but has purchased other types of products made by Brand A. By determining whether the overall customer loyalty score 255 for Brand A is high or low, a supplier 270 can predict how willing the user would be to purchase cheddar cheese made by Brand B instead of Brand A. If likely, the supplier may submit a bid for the cheese under Brand B instead of the original product requested by the user—i.e., the cheese sold under Brand A.

In one embodiment, when requesting bids from the suppliers 270, the auction application 220 transmits the user preferences 225, the user characteristics 230, and related loyalty scores 255 to the suppliers 270. While the auction application 220 can send all this information to the supplier 270, in other embodiments the auction application 220 may send only a portion of this information. For example, the auction application 220 may track the user preferences 225 and the user characteristics 230 but not the loyalty scores 225. Regardless, the auction application 220 transmits at least some user information to the suppliers 270 which aids the suppliers to provide customized bids as described in more detail below.

The auction application 220 also includes the feedback engine 260 that provides the results of the reverse auction to the suppliers 270. In one embodiment, the suppliers 270 use the results to update user profiles 280 which help the suppliers 270 to customize the bids. That is, the suppliers 270 can each include a bid generator 275 which use the user information provided by the auction application 220 and the user profiles 280 to customize bids for the particular user initiating the reverse auction. In one embodiment, the feedback engine 260 provides information regarding the winning bid to both the supplier 270 which submitted the winning bid as well as to the suppliers 270 that submitted losing bids. Doing so may aid the suppliers 270 to provide more competitive bids when submitting future bids to the user. Further, this may help the user by increasing the competition amongst the suppliers 270 (since all the suppliers 270 are informed of the winning big) which may reduce the price of future bids or cause the suppliers to submit types of bids that the user prefers, such as bids with incentives or combination orders.

In addition to providing feedback to the suppliers 270, the feedback engine 260 can provide feedback to the advertisers 285. For example, the feedback engine 260 may send the advertisement selected by the user to the advertisers 285 as well as ancillary data about that advertisement such as where the advertisement was displayed (a TV show, newspaper, store display, billboard, etc.) and the location of the user (e.g., in a mall, on public transportation, movie theater, at home, or browsing the Internet). An advertisement profiler 290 can use this information to identify which advertisements successfully reach the user and which do not. Further, the advertisement profiler 290 can identify related products the user might be interested in and display those advertisements in a manner where they are likely to be seen by the user.

Although not shown, the user device may include one or more processors for executing the auction application 220 (which may be a software application). Additionally, the bid generator 275 and the advertisement profiler 290 may be software applications that are executed in a server, a data center, or in a cloud computing environment.

Figure 3:
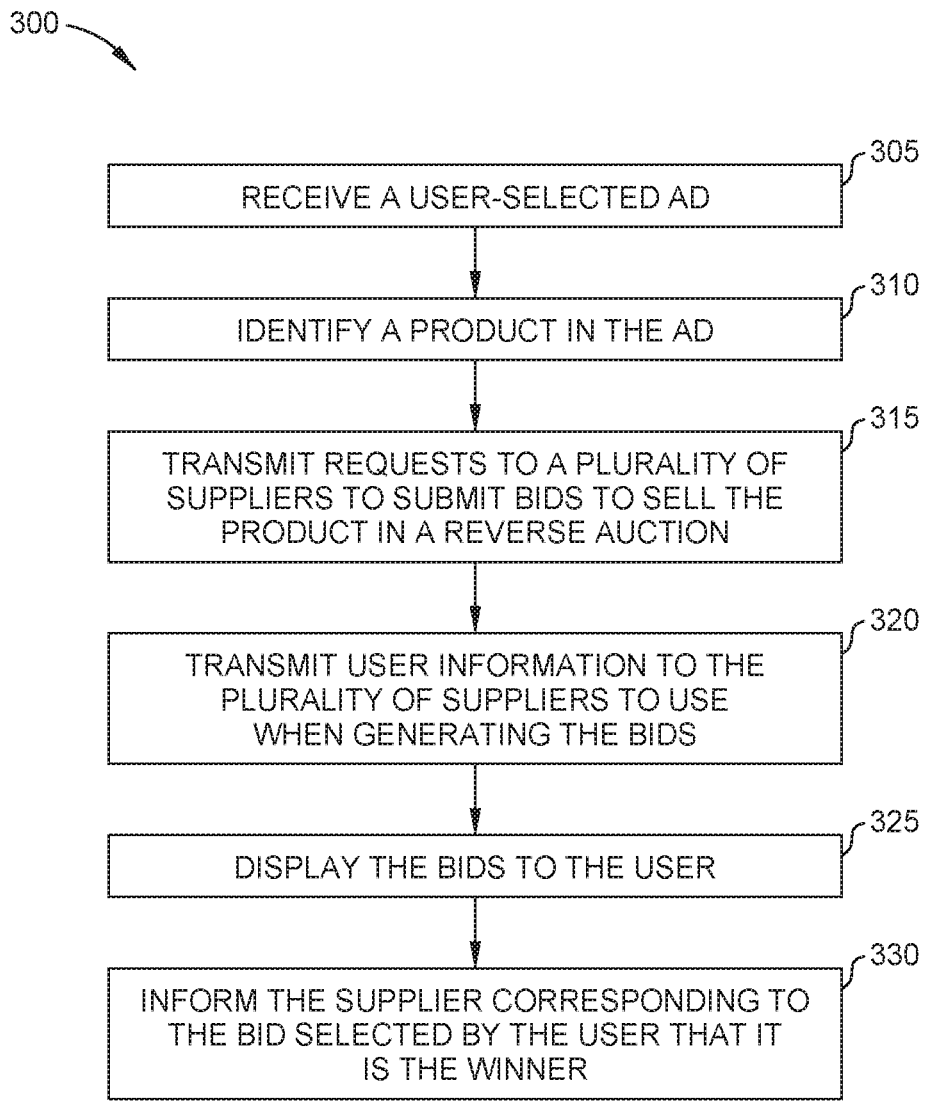
FIG. 3 is a flowchart for performing a reverse auction where user preferences are provided to the bidders, according to one embodiment.

FIG. 3 is a flowchart of a method 300 for performing a reverse auction where user preferences are provided to the bidders, according to one embodiment. At block 305, the auction application receives a user-selected advertisement that includes at least one bid item (e.g., a product, good, or service). As mentioned above, the advertisement may be captured using a camera in the user device executing the auction application. However, in another example, the advertisement may be a banner advertisement in a webpage or in an email containing a special offer.

At block 310, the auction application identifies a product in the advertisement. That is, the auction application may parse the image to identify what product is actually advertised. The auction application may use an optical character recognition technique to identify text in the image to identify the product. In another example, the advertisement may not have the name of the product in text in which case the auction application can use an image recognition technique to identify the product. In yet another example, the advertisement may have a 1D or 2D barcode which can be decoded and used to identify the product being advertised.

In another embodiment, rather than receiving a formal advertisement, the user may capture a picture of an item she sees in a storefront or on a shelf which she wants to purchase. For example, the user may be viewing furniture in a store and take a picture of a recliner she likes best to initiate the reverse auction. In this example, the auction application may include a computer vision program (which may be hosted natively on the user device or executed remotely in a cloud computing environment) that identifies a particular product in the image—e.g., the recliner. In another example, the user may capture an image of the tag on the product that includes a unique identifier of the product (e.g., a Universal Product Code (UPC)) or the brand and model number of the product. This information can then be used to identify the product. Thus, the embodiments herein are not limited to the auction application receiving a formal advertisement of the bid item in order to initiate the reverse auction.

At block 315, the auction application transmits requests to a plurality of suppliers to submit bids to sell the product in a reverse auction. In one embodiment, performing block 315 begins the reverse auction where the auction application invites suppliers to submit bids.

In one embodiment, the auction application chooses the suppliers in response to the type of the bid item (e.g., the product). For example, the auction application may first categorize the bid item to determine its type—e.g., food, apparel, home good, electronics, indoor furniture, outdoor furniture, personal hygiene service, landscaping service, home repair service, and the like. The auction application may maintain a list of suppliers for each of those types (where some suppliers may be on multiple lists if they sell different types of goods and services). In another embodiment, the auction application may not categorize the bid item but instead send the item to all the suppliers. The suppliers can then check whether they carry the item before submitting a bid.

In one embodiment, the developer of the auction application charges a service fee for the suppliers to submit bids. For example, the suppliers may pay a yearly fee or be charged according to the number of bids they submit to take part in the reverse auction. Or a supplier may only pay the developer when a bid is selected as the user (e.g., a fixed percentage of the purchase price).

At block 320, the auction application transmits user information to the plurality of suppliers to use when generating the bids. The user information can include user preferences, user characteristics, and brand loyalty. As mentioned above, the user preferences can include whether the user occasionally chooses alternative deals during a reverse auction, prefers (or requires) free shipping, is frugal (e.g., chooses the least expensive bids), and the like. The user characteristics can include demographic information of the user such as age, marital status, education, profession, income level, geographic location, and the like. The brand loyalty scores represent the user's loyalty to a particular brand as whole or to a particular product sold under that brand. However, there may be additional user information other than what is recited here that may be useful to suppliers when generating the bids. The different techniques for generating or collecting the user information are described in FIG. 4. Moreover, different techniques that a supplier may use for processing the user information when generating the bids is described in FIG. 5.

At block 325, the auction application displays the bids received from the suppliers to the user. For example, the auction application may wait to receive all the bids before displaying the bids (which may be almost instantaneous, or require some time depending on the level of automation of the bid generation process for each of the suppliers).

In one embodiment, the user device displays the bids along with a corresponding interactive element (e.g., a button or other selection element) that permits the user to select a winning bid. In addition, the auction application may display a feedback portion where the user can provide feedback why she did or did not select a particular bid. This feedback can help to update the user information stored by the auction application as well as a user profile maintained by the suppliers. For example, the user may have asked for a type of soda sold by Brand X but one supplier may have offered a bid for soda sold by Brand Y (e.g., because that supplier is currently running a promotion on that brand). The user may provide feedback that she does not like Brand Y soda. In response, the loyalty engine can reduce the loyalty score for Brand Y soda (or Brand Y as a whole) in addition to the suppliers updating their user profiles.

At block 330, the auction application informs the supplier corresponding to the bid selected by user that it is the winner. That is, the auction application informs the supplier with the winning bid that it now has a contract to sell the product or service to the user. In one embodiment, the auction application may prompt the user for payment information and how/when the item will be delivered. Alternatively, the user could have preconfigured the auction application with payment information (e.g., a credit card number) which the auction application can use to automatically pay the supplier once the user selects the winning bid.

Figure 4:
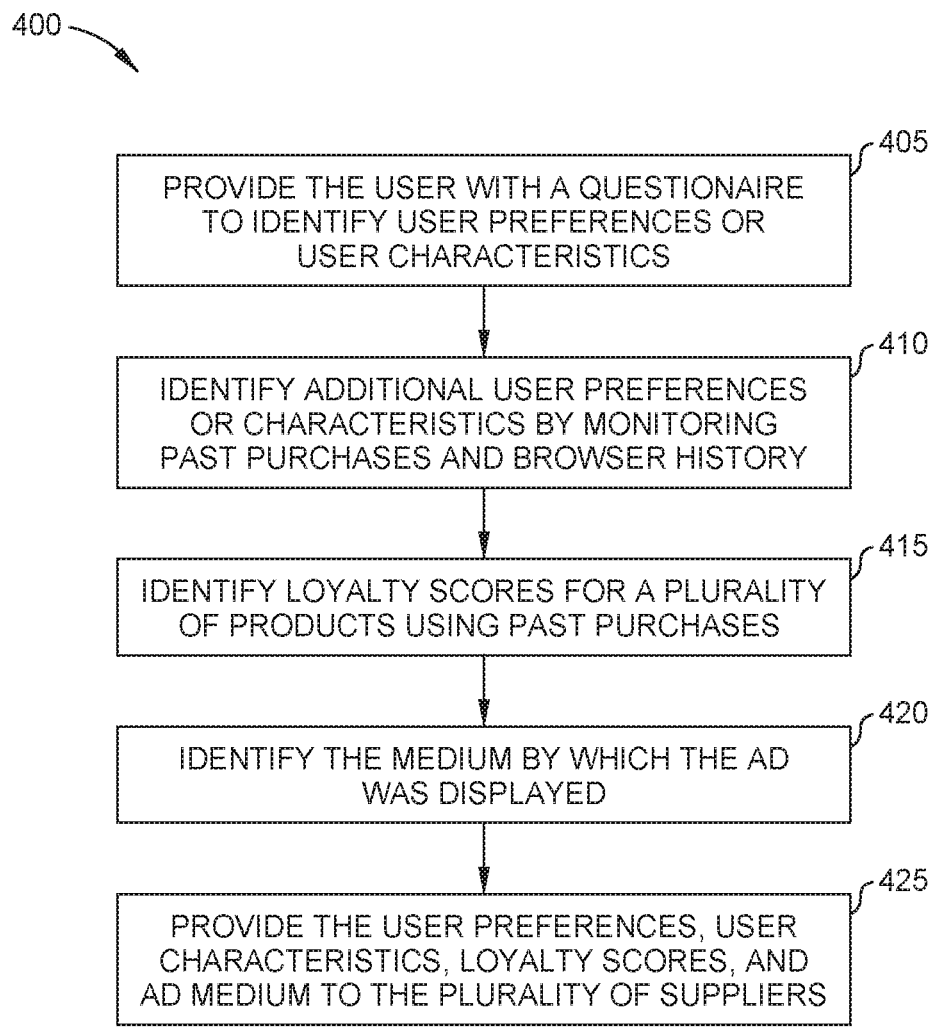
FIG. 4 is a flowchart for generating user information used for customizing bids in a reverse auction, according to one embodiment.

FIG. 4 is a flowchart of a method 400 for generating user information used for customizing bids in a reverse auction, according to one embodiment. For example, the method 400 can be performed to collect or generate user information that is provided to the suppliers at block 320 of the method 300.

At block 405, the auction application provides the user with a questionnaire to identify user preferences or user characteristics. For example, the questionnaire may ask the user if she does not care about free shipping, likes free shipping, or requires free shipping. The questionnaire could also ask what brick and mortar stores or online stores the user shops at most frequently. The questionnaire could also ask demographic information about the user such as age, income level, and the like.

At block 410, the profile engine in the auction application identifies additional user preferences or user characteristics by monitoring past purchases and browser history. For example, the user may typically purchase luxury goods which may indicate the income level of the user. Or the user may never select the cheapest bid which may indicate the quality the user expects from the products she purchases. Using past purchases, the profile engine may also deduce that the user lives in a house or apartment or has children or a spouse. In another example, the profile engine may determine that the user prefers combination orders (e.g., a type of bid) where ancillary products are bundled with the bid item.

Using browser history, the profile engine may determine the frugality of the user. For example, if the user visits websites that specialize in selling bulk or on-sale items, the user may be viewed as more frugal than another user who visit websites for luxury goods. In another example, the profile engine can use browser history to estimate the demographics of the user—e.g., the user's age or family size.

At block 415, the loyalty engine in the auction application identifies loyalty scores for a plurality of products using past purchase. For example, the user may have previously initiated reverse auctions for several different types of food, but did not specify a brand. Based on the winning bids, the loyalty engine can determine the user prefers one brand over others that were offered in the bids. The loyalty engine can then update loyalty scores associated with those brands.

In another example, the user may request a recliner sold under a particular brand (which was displayed in an advertisement for that brand) but end up purchasing another similar recliner that is sold under a different brand. The loyalty engine may decrease the loyalty score for that brand since the user ended up purchasing a different brand even though she initiated a reverse auction for that particular brand of recliner.

Moreover, the loyalty engine can track loyalty scores for specific products. For example, the loyalty score for toothpaste made by Brand X may be higher relative to other brands of toothpaste but the loyalty score for mouthwash sold under that same brand—Brand X—may be much lower that other brands of mouthwash. Thus, the loyalty engine can track brand loyalty for specific products as well as brand loyalty as a whole.

At block 420, the auction application identifies the medium by which the advertisement was displayed. For example, the user may have captured an image of an advertisement displayed in a TV show, movie in a theater, newspaper, store display, and the like. Providing this information to the suppliers may help generate their bids because it can tell the suppliers about the user. For example, if the advertisement was displayed in a kid's TV show, the suppliers might assume the user has children. If the advertisement was displayed in a particular newspaper, the suppliers may assume the user has similar demographics as the other readers of that newspaper. In this manner, knowing the medium by which the advertisement was delivered can aid the suppliers when providing bids. However, the techniques herein are not limited to generating bids using captured images of advertisements. In the cases where the reverse auction was initiated without capturing an image of an advertisement, this step in the method 400 may be omitted.

At block 425, the auction application provides the user preferences, user characteristics, loyalty scores, and ad medium to the plurality of suppliers for use when generating customized bids for the user.

Figure 5:
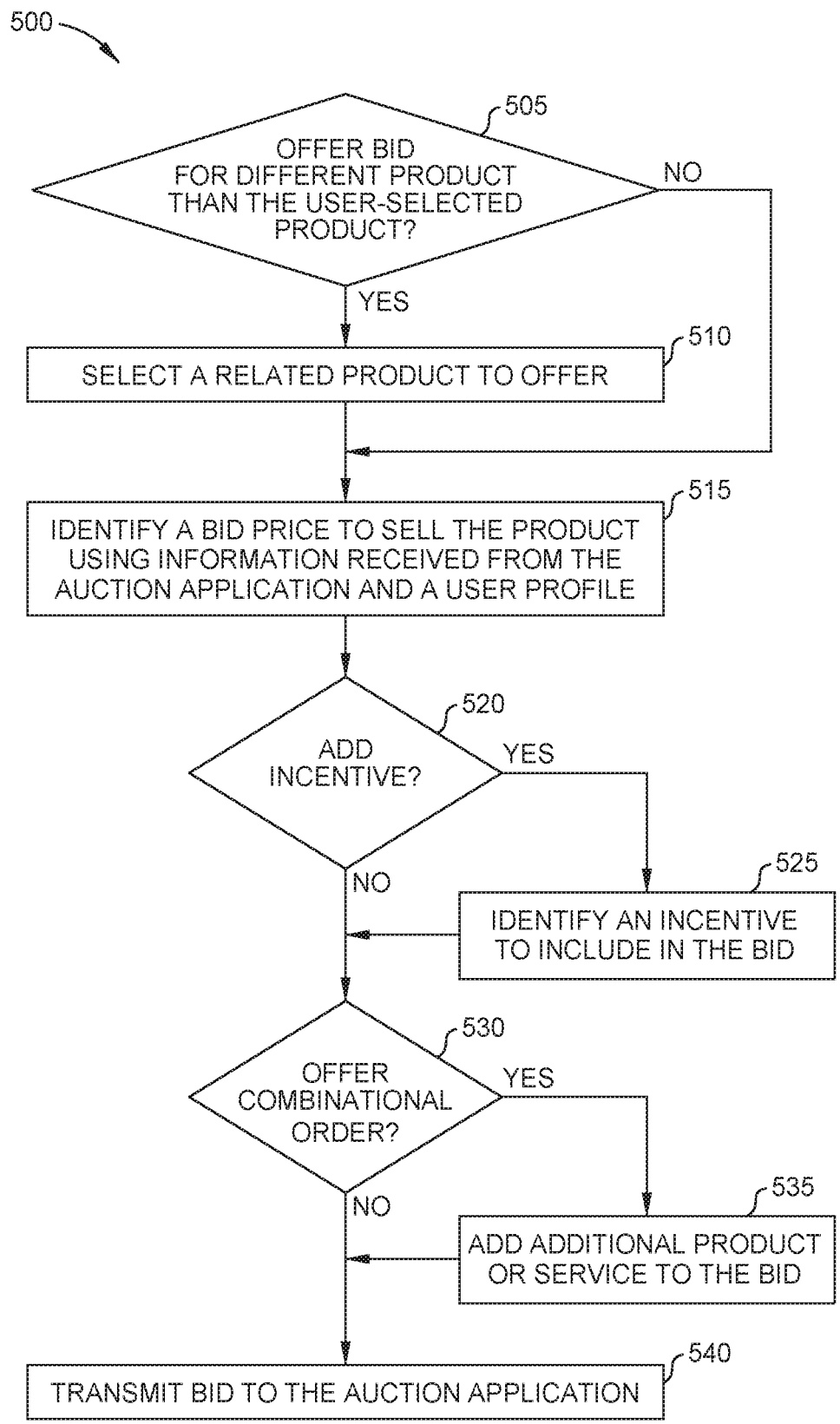
FIG. 5 is a flowchart for customizing a bid using user preferences, according to one embodiment.

FIG. 5 is a flowchart of a method 500 for customizing a bid using user preferences, according to one embodiment. In one embodiment, the method 500 begins after the suppliers have received a request from the auction application to submit bids (e.g., block 315 of the method 300) and after receiving some or all of the user information described in the method 400.

At block 505, the bid generator for the supplier determines whether to offer a bid that is for a different product than the user-selected product. For example, the user may have requested a bid for toothpaste sold under Brand A but the bid generator may instead decide to offer a bid for toothpaste sold under Brand B. This decision can be influenced by the brand loyalty score. If the score is low, the bid generator may predict the supplier can lure the customer away from Brand A. In another example, the bid generator may know that the customer is frugal. Even if the customer has a high loyalty score for Brand A, if the supplier has a sale on toothpaste sold by Brand B (or is trying to promote that brand of toothpaste), the bid generator may determine to instead offer the toothpaste sold by Brand B instead of Brand A as original requested by the user at a reduced price.

In one embodiment, the supplier may not have the user-selected product in inventory. In that case, the bid generator may decide at block 505 to offer a product sold by a different brand using the loyalty score (or may decide not to offer any bid). For example, the bid generator may know that the user has a high loyalty score for a different brand which the supplier does have inventory. The bid generator can then offer the product sold by that brand instead.

If the bid generator determines to provide a bid for a different brand, the method 500 proceeds to block 510 where the bid generator selects a related product to offer. The related product could be the same type of product, but sold under a different brand, or be an alternative product. For example, the user may request bids on a bicycle, but the bid generator may instead offer a bid on an electric scooter based on the demographics of the user.

The method 500 proceeds to block 515 where the bid generator identifies a bid price to sell the product using information received from the auction application and a user profile. Here, the bid generator can consider the frugality of the user, the quality of product preferred by the user (e.g., the user typically does not select the least expensive bid), and the brand loyalty (e.g., the user may pay more for her preferred brand).

The bid generator can also use a user profile stored by the supplier which can supplement the user information obtained from the auction application. For example, the user profile can have other information such as purchases the user made in the suppliers brick and mortar stores which is not available to the auction application. Also, the user profile can include other metrics obtained or derived by the supplier which are different than the user information provided by the auction application.

At block 520, the bid generator determines whether to add an incentive to the bid based on the user information received from the auction application. For example, the user's preference for free shipping or for buy-one-get-one free promotions can be used to determine when to offer an incentive to the bid. If the bid generator determines to add an incentive, the method 500 proceeds to block 525 where an incentive is added to the bid. For example, the user may have requested a six pack of soda but instead the bid generator may offer two six packs of the same type of soda. In one embodiment, the bid generator may change the bid price if an incentive is added. For example, the bid generator may increase the price when offering a buy-one-get-one free incentive or when offering free shipping versus a bid that was originally priced at block 515 assuming in store pickup.

At block 530, the bid generator determines whether to offer a combination order. In one embodiment, the combination order may include a related product that the supplier would like to promote. For example, the user-selected product may have been toothpaste but the bid generator may offer both the toothpaste and a toothbrush. Or the user-selected product may have been a six-pack of soda sold by Brand A but the bid generator may also add another six-pack of soda sold by Brand B to the order. Again, the user preferences can inform the bid generator on the user's preference regarding combination orders which the bid generator can use to predict the success of submitting a bid with a combination order. At block 535, the bid generator can add the additional product or service to the bid that includes a combination order. For example, the user-selected item may have been a coffee machine, but the added service may be a subscription where coffee is shipped the user every month. Like when adding an incentive, the price of the bid may change when a combination order is added to the bid.

At block 540, the bid generator transmits the bid to the auction application. The bid can have been modified at only one, two, or all of the blocks 510, 525, and 535. That is, the bid generator may have determined not to offer a different related product but may have added an incentive or a combination order to the bid. Alternatively, the bid generator may have decided to offer a different product than the user-selected product and also added an incentive and a combination order to the bid. Thus, the method 500 illustrates the various ways a supplier can use the user information supplied by the auction application to generate a customized bid for the user.

Figure 6:
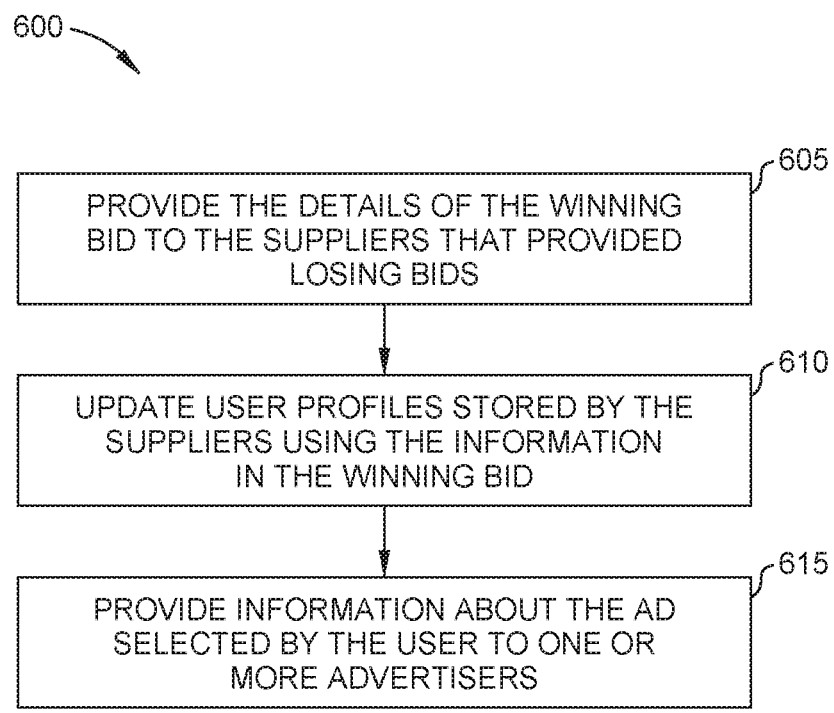
FIG. 6 is a flowchart for providing feedback at the conclusion of a reverse auction, according to one embodiment.

FIG. 6 is a flowchart of a method 600 for providing feedback at the conclusion of a reverse auction, according to one embodiment. That is, method 600 may be performed at the end of the method 300.

At block 605, the feedback engine in the auction application provides the details of the winning bid to the suppliers that provided losing bids. That is, in addition to informing the winning supplier, the auction application can provide the details of the winning bid to the losing suppliers such as the winning bid price, whether the bid was for the same product or a different product, and the bid type (e.g., whether the bid had an incentive or combination order). Doing so may further customize or tailor future reverse auctions to the preferences of the user.

At block 610, the suppliers update user profiles using the information in the winning bid. That is, the suppliers can use the details of the winning bid to update their profile of the user such as brand loyalty, the effectiveness of incentives or combination orders, frugality, and the like. The suppliers can then use those user profiles along with updated user information provided by the auction application in future reverse auctions initiated by the user.

At block 615, the feedback engine in the auction application provides information about the advertisement selected by the user to one or more advertisers. This feedback can help the advertisers identify advertisements that effectively reach the user and which do not. For example, the user may initiate reverse auctions using advertisements printed in a newspaper or on a webpage but never advertisements shown in movie theaters. The feedback module may also send the location of the user when selecting the advertisement (e.g., the user was in a mall or store) which can help the advertiser identify which medium is most likely to be seen by the user.

In addition to providing the advertisers with the advertisement, the feedback engine may also send the user characteristics to the advertisers. The demographics of the user along with the type of products the user selects can be used by the advertisers to provide more customized advertisements to the user which are more likely to be of interest to the user, and are more likely to be seen by the user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

executing, by a processor of a mobile device, an application;

capturing an image of a bid item using a camera of a mobile device of a user indicating a desire of the user to purchase the bid item;

analyzing, by the processor of the mobile device, the captured image with at least one of an optical character recognition technique or an image recognition technique to identify the bid item;

determining, by the processor of the mobile device, an item category for the bid item;

determining, by the processor of the mobile device referencing a list of suppliers and categories of items sold by the suppliers, a plurality of suppliers that sell the item category and a supplier that does not sell the item category;

transmitting, by the processor of the mobile device executing the application, requests to servers of the plurality of suppliers that sell the item category but not to a server of the supplier that does not sell the item category to submit bids for selling the bid item to the user;

predicting, by the processor of the mobile device, (i) an income level of the user based on previous purchases made by the user or (ii) an age of the user based on a web-browsing history of the user;

transmitting, by the processor of the mobile device, the income level of the user or the age of the user from the mobile device to the servers of the plurality of suppliers, wherein:

a server of a supplier of the plurality of suppliers implementing a bid generator that determines, based on (i) a previous purchase of the user at a store of the supplier indicated by a user profile stored by the server of the supplier, (ii) at least one of a frugality of the user, a preferred product quality of the user, or a brand loyalty score of the user indicated by the user profile, and (iii) at least one of the income level of the user or the age of the user received from the processor of the mobile device executing the application, a customized bid comprising a bid price at which the user can purchase the bid item from the supplier in response to detecting a request of the requests transmitted by the processor of the mobile device;

the bid generator further adds to the customized bid, based on a preference of the user for free shipping indicated by the user profile stored by the server of the supplier, a free shipping incentive for the bid item;

the bid generator changes the bid price in response to adding the free shipping incentive to the customized bid;

the bid generator further adds to the customized bid, based on a preference of the user for combination orders indicated by the user profile, an additional item from the supplier of the plurality of suppliers; and the bid generator changes the bid price in response to adding the additional item to the customized bid;

displaying, on a display of the mobile device, customized bids received from the servers of the plurality of suppliers along with corresponding interactive elements;

detecting, by the processor of the mobile device, an interaction with a displayed interactive element corresponding to the customized bid from the server of the supplier of the plurality of suppliers indicating a selection by the user of the customized bid; and in response to detecting the interaction, informing, by the processor of the mobile device, the server of the supplier of the plurality of suppliers that generated the customized bid that the user has selected the customized bid.

2. The method of claim 1, further comprising evaluating a past purchase of the user to identify a preference of the user indicating a likelihood of the user selecting a type of bid in the future.

3. The method of claim 1, wherein the brand loyalty score corresponds to a first brand of the bid item, wherein, in response to transmitting the brand loyalty score to the plurality of suppliers, at least one of the customized bids contains a bid item sold under a second brand different from the first brand.

4. The method of claim 1 further comprising transmitting a location of the user when capturing the image to one or more advertisers.

5. The method of claim 1, further comprising transmitting details of the selected, customized bid to multiple losing suppliers of the plurality of suppliers, wherein the details comprises the price of the selected, customized bid and a type of the selected, customized bid.

6. A user device comprising:
a display;
a camera;
a processor; and
a memory containing an auction application, wherein, when executed by the processor, the auction application performs an operation, the operation comprising:
capturing an image of a bid item using the camera indicating a desire of a user to purchase the bid item;
analyzing, by the processor, the captured image with at least one of an optical character recognition technique or an image recognition technique to identify the bid item;
determining, by the processor, an item category for the bid item;
determining, by the processor referencing a list of suppliers and categories of items sold by the suppliers, a plurality of suppliers that sell the item category and a supplier that does not sell the item category;
transmitting, by the processor, requests to servers of the plurality of suppliers that sell the item category but not to a server of the supplier that does not sell the item category to submit bids for selling the bid item to the user;

predicting, by the processor, (i) an income level of the user based on previous purchases made by the user or (ii) an age of the user based on a web-browsing history of the user;

transmitting, by the processor, the income level of the user or the age of the user to the servers of the plurality of suppliers, wherein:
a server of a supplier of the plurality of suppliers implementing a bid generator that determines, based on (i) a previous purchase of the user at a store of the supplier indicated by a user profile stored by the server of the supplier, (ii) at least one of a frugality of the user, a preferred product quality of the user, or a brand loyalty score of the user indicated by the user profile, and (iii) at least one of the income level of the user or the age of the user received from the processor, a customized bid comprising a bid price at which the user can purchase the bid item from the supplier in response to detecting a request of the requests transmitted by the processor;

the bid generator further adds to the customized bid, based on a preference of the user for free shipping indicated by the user profile stored by the server of the supplier, a free shipping incentive for the bid item;

the bid generator changes the bid price in response to adding the free shipping incentive to the customized bid;

the bid generator further adds to the customized bid, based on a preference of the user for combination orders indicated by the user profile, an additional item from the supplier of the plurality of suppliers; and the bid generator changes the bid price in response to adding the additional item to the customized bid;

displaying, on the display, customized bids received from the servers of the plurality of suppliers along with corresponding interactive elements;

detecting, by the processor, an interaction with a displayed interactive element corresponding to the customized bid from the server of the supplier of the plurality of suppliers indicating a selection by the user of the customized bid; and in response to detecting the interaction, informing, by the processor, the server of the supplier of the plurality of suppliers that generated the customized bid that the user has selected the customized bid.

7. The user device of claim 6, further comprising evaluating a past purchase of the user to identify a preference of the user indicating a likelihood of the user selecting a type of bid in the future.

8. The user device of claim 6, wherein the brand loyalty score corresponds to a first brand of the bid item, wherein, in response to transmitting the brand loyalty score to the plurality of suppliers, at least one of the customized bids contains a bid item sold under a second brand different from the first brand.

9. A method, comprising:
receiving, by a server of a supplier, a request from an auction application executing on a mobile device, to submit a bid for selling a bid item to a user, the bid item identified by analyzing, by the mobile device and with at least one of an optical character recognition technique or an image recognition technique, an image of the bid item captured by a camera of the mobile device, wherein the request was transmitted to the server of the supplier in response to a determination, by the mobile device referencing a list of suppliers and categories of items sold by the suppliers, that the supplier sells an item category of the bid item, and wherein the request was not transmitted to a second supplier in response to a determination, by the mobile device, that the second supplier does not sell the bid item;

receiving, by the server of the supplier, an income level of the user or an age of the user from the auction application, wherein the income level is predicted, by the mobile device, based on previous purchases made by the user, and wherein the age is predicted based on a web-browsing history of the user;

determining, by a bid generator implemented by the server of the supplier and based on (i) a previous purchase of the user at a store of the supplier indicated by a user profile stored by the server of the supplier, (ii) at least one of a frugality of the user, a preferred product quality of the user, or a brand loyalty of the user indicated by the user profile, and (iii) at least one of the income level of the user or the age of the user received from the mobile device executing the application, a customized bid comprising a bid price at which the user can purchase the bid item from the supplier in response to the request;

adding to the customized bid, by the bid generator and based on a preference of the user for free shipping indicated by the user profile stored by the server of the supplier, a free shipping incentive for the bid item;

changing the bid price in response to adding the free shipping incentive to the customized bid;

adding to the customized bid, by the bid generator and based on a preference of the user for combination orders indicated by the user profile, an additional item from the supplier;

changing the bid price in response to adding the additional item to the customized bid;

transmitting, by the server of the supplier, the customized bid to the auction application for display to the user along with a corresponding interactive element; and receiving, by the server of the supplier, an indication that the user has selected the bid, wherein the indication is generated in response to a detection by the mobile device that the user interacted with the interactive element corresponding to the bid.

* * * * *